United States Patent
Zhang et al.

(10) Patent No.: US 12,108,069 B1
(45) Date of Patent: Oct. 1, 2024

(54) METHOD, APPARATUS, SYSTEM, AND ELECTRONIC DEVICE FOR TRANSMITTING COMPOSITE PHOTO DATA

(71) Applicant: UGREEN GROUP LIMITED, Guangdong (CN)

(72) Inventors: Qingsen Zhang, Guangdong (CN); Junling Chen, Guangdong (CN); Jiashu Huang, Guangdong (CN); Qibang Yi, Guangdong (CN); Weiming Chen, Guangdong (CN)

(73) Assignee: UGREEN GROUP LIMITED, Shenzhen (CN)

( * ) Notice: Subject to any disclaimer, the term of this patent is extended or adjusted under 35 U.S.C. 154(b) by 0 days.

(21) Appl. No.: 18/673,368

(22) Filed: May 24, 2024

Related U.S. Application Data (63) Continuation of application No. PCT/CN2022/091375, filed on May 7, 2022.

(30) Foreign Application Priority Data

Apr. 18, 2022 (CN) .......................... 202210403529.2

(51) Int. Cl.
*G06V 10/00* (2022.01)
*H04N 19/46* (2014.01)

(52) U.S. Cl.
CPC .................................. *H04N 19/46* (2014.11)

(58) Field of Classification Search
CPC .... H04N 19/46; H04N 11/146; H04N 11/165; H04N 11/186; H04N 19/40; H04N 19/44;
(Continued)

(56) References Cited

U.S. PATENT DOCUMENTS 5,109,158 A * 4/1992 Horne ................... H04N 25/41
250/353
5,272,025 A * 12/1993 Wheeler ................ G03C 11/14
382/284
(Continued)

FOREIGN PATENT DOCUMENTS

| CN | 101047822 A | 10/2007 |
| CN | 103327189 A | 9/2013 |

(Continued)

OTHER PUBLICATIONS

International Search Report of PCT Patent Application No. PCT/CN2022/091375 issued on Dec. 26, 2022.
(Continued)

*Primary Examiner* — Amir Alavi (57) ABSTRACT

Disclosed in the present disclosure is a method, an apparatus, a system, a device, a storage medium, and a program product for transmitting composite photo data, the method including: responding to a first transmission request triggered by a first user; obtaining target composite photo data directed by the first transmission request, in which the target composite photo data includes at least one piece of first photo data and at least one piece of first video data corresponding to the first photo data; compressing and processing the target composite photo data according to the first photo data to obtain first compressed data having an identical data facade to that of the first photo data; and transmitting the first compressed data to a first terminal position corresponding to the first transmission request.

9 Claims, 2 Drawing Sheets

(58) Field of Classification Search
CPC ........... H04N 19/45; G06T 9/00; G06T 9/001; G06T 9/002; G06T 9/004; G06T 9/005; G06T 9/007; G06T 9/008; G06T 9/20; G06T 9/40; G06T 3/4038; G06T 2207/20212; G06T 2207/20216; G06T 2207/20221; G06T 2207/20224; H03M 7/425; H03M 7/6005
See application file for complete search history.

(56) References Cited

U.S. PATENT DOCUMENTS

| | | | | |
|---|---|---|---|---|
| 5,897,976 | A * | 4/1999 | Carcia | G03F 1/32 430/5 |
| 6,120,942 | A * | 9/2000 | Reinberg | G03F 1/58 430/5 |
| 6,208,445 | B1 * | 3/2001 | Reime | H04B 10/114 398/189 |
| 6,795,226 | B2 * | 9/2004 | Agrawal | G02F 1/163 359/254 |
| 7,387,451 | B2 * | 6/2008 | Goossen | G02B 6/4214 385/39 |
| 7,535,539 | B2 * | 5/2009 | Sakurai | G02F 1/167 345/694 |
| 8,681,411 | B2 * | 3/2014 | Ahn | G02F 1/017 359/243 |
| 8,830,439 | B2 * | 9/2014 | Asako | G02F 1/133512 349/110 |
| 9,986,177 | B2 * | 5/2018 | Barnes | B64U 20/87 |
| 2007/0065143 | A1 * | 3/2007 | Didow | H04N 5/84 386/E5.061 |
| 2019/0339885 | A1 | 11/2019 | Yanagihara et al. | |

FOREIGN PATENT DOCUMENTS

| | | |
|---|---|---|
| CN | 104243923 A | 12/2014 |
| CN | 106230804 A | 12/2016 |
| CN | 106657811 A | 5/2017 |
| CN | 107948724 A | 4/2018 |
| CN | 110191170 A | 8/2019 |
| CN | 110838969 A | 2/2020 |
| CN | 112995717 A | 6/2021 |
| CN | 113301422 A | 8/2021 |
| CN | 113626626 A | 11/2021 |
| CN | 114143140 A | 3/2022 |
| KR | 20070059887 A | 6/2007 |

OTHER PUBLICATIONS

Queping Zou et al., Design of fiber optic transmission system based on uncompressed multiplexed digital video, Information & Communications, 2019, pp. 203-204, Issue 3, No. 195.

Kalpana Seshadrinathan et al., Study of Subjective and Objective Quality Assessment of Video, IEEE Transactions on Image Processing, 2009, pp. 1-16.

Notice of Allowance of counterpart Chinese Patent Application No. 202210403529.2 issued on Feb. 25, 2023.

First Office Action of counterpart Chinese Patent Application No. 202210403529.2 issued on Dec. 22, 2022.

* cited by examiner

METHOD, APPARATUS, SYSTEM, AND ELECTRONIC DEVICE FOR TRANSMITTING COMPOSITE PHOTO DATA

CROSS REFERENCE TO RELATED APPLICATIONS

The present application is a Continuation Application of PCT Application No. PCT/CN2022/091375 filed on May 7, 2022, which claims the benefit of Chinese Patent Application No. 202210403529.2 filed on Apr. 18, 2022. All the above are hereby incorporated by reference in their entirety.

FIELD

The present disclosure relates to the technical field of data transmission and, particularly, to a method, an apparatus, a system, a device, a storage medium, and a program product for transmitting composite photo data.

BACKGROUND

With the development of photographic technology, an increasing number of companies began to develop more novel photo technology to win the favor of consumers. Composite photo technology is one of such technologies, which produces a composite photo data that includes both photo data and a video data before and after the time point at which the photo data was taken, for example, the live photos in iPhones. A similar photo technology has also been introduced in Samsung's Galaxy S7 or Camera MX software.

However, when transmitting such composite photo data, such as when backing it up to the cloud, due to the complexity of the data content and the necessity to keep the consistency of a variety of data during transmission, it is common to package it into a compressed format for transmission in the existing data transmission technology, e.g., the iPhone packages it into the LIVP format. However, such compressed formats are typically not recognizable by the system and likewise are not directly recognizable by the user.

With the existing method, it is not possible to perceive which photo data is the currently transmitted compressed data during data transmission, so the use experience is inferior, and it is easy to misoperate due to incorrect recognition of the data. It is evident that the prior art is flawed and urgent to be solved.

SUMMARY

Provided in the present disclosure is a method, an apparatus, a system, a device, a storage medium, and a program product for transmitting composite photo data, which allows the user to transmit the composite photo data in such a way that the user may always maintain a subjective perception of the photo data, effectively reducing the user's misoperation and improving the user's experience.

To solve the aforementioned technical problem, disclosed in a first aspect of the present disclosure is a method for transmitting composite photo data, the method including:

responding to a first transmission request triggered by a first user; obtaining target composite photo data directed by the first transmission request, in which the target composite photo data includes at least one piece of first photo data and at least one piece of first video data corresponding to the first photo data;

compressing and processing the target composite photo data according to the first photo data to obtain first compressed data having an identical data facade to that of the first photo data; and transmitting the first compressed data to a first terminal position corresponding to the first transmission request.

As an optional implementation, in the first aspect of the present disclosure, compressing and processing the target composite photo data according to the first photo data to obtain the first compressed data having an identical data facade to that of the first photo data includes:

obtaining a first data title and a first data suffix of the first photo data;

compressing the target composite photo data to obtain the first compressed data;

identifying a data title of the first compressed data to be the first data title; and identifying a data suffix of the first compressed data to be the first data suffix.

Disclosed in a second aspect of the present disclosure is an electronic device, including:

a memory, memorized with an executable code; and
a processor, coupled with the memory, in which the processor invokes the executable code memorized in the memory to perform some or all steps in the method for transmitting composite photo data, disclosed in the first aspect of the present disclosure.

Disclosed in a third aspect of the present disclosure is a non-transitory computer memory medium including computer instructions, in which the computer instructions are invoked to perform some or all steps in the method for transmitting composite photo data, disclosed in the first aspect of the present disclosure.

Compared to the prior art, the present disclosure provides beneficial effects as follows.

In the present disclosure, the composite photo data may be compressed to modify the data facade to be identical to that of the photo data, and then the data may be transmitted, which allows the user to transmit the composite photo data in such a way that the user may always maintain a subjective perception of the photo data, effectively reducing the user's misoperation and improving the user's experience.

BRIEF DESCRIPTION OF THE DRAWINGS

In order to illustrate the technical solutions of the embodiments of the present disclosure more clearly, the following drawings are briefly described as required in the context of the embodiments. Obviously, the following drawings illustrate only some of the embodiments of the present disclosure. Other relevant drawings may be obtained on the basis of these drawings without any creative effort by those skilled in the art.

DETAILED DESCRIPTION OF THE EMBODIMENTS

Disclosed in the present disclosure is a method, an apparatus, a system, a device, a storage medium, and a program product for transmitting composite photo data, in which the composite photo data may be compressed to modify the data facade to be identical to that of the photo data, and then the data may be transmitted, which allows the user to transmit the composite photo data in such a way that the user may always maintain a subjective perception of the photo data, effectively reducing the user's misoperation and improving the user's experience. Detailed descriptions are provided respectively as follows.

Embodiment 1

Figure 1:
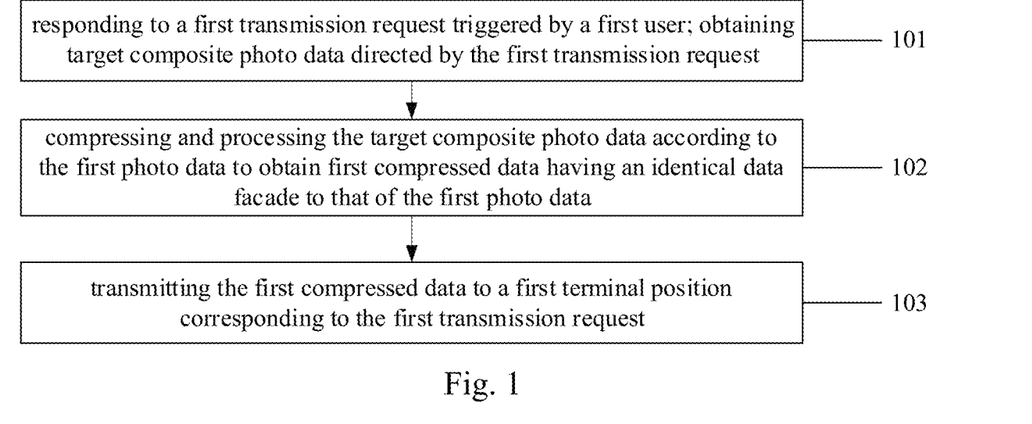
FIG. 1 is a schematic flow diagram of a method for transmitting composite photo data disclosed in an embodiment of the present disclosure.

Please refer to FIG. 1, FIG. 1 is a schematic flow diagram of a method for transmitting composite photo data disclosed in the present embodiment of the disclosure. The method described in FIG. 1 may be applied in a corresponding apparatus for transmitting composite photo data, such as a transmission terminal, a transmission device, or a transmission server being either a cloud-based server or a local server, which is not limited in the embodiment of the present disclosure.

Preferably, the method of the present embodiment of the disclosure may be applied to a user terminal, such as a computer, a mobile phone, or other device terminal that stores the composite photo data, and executed by the user terminal to achieve the transmission of the composite photo data, such as backing up the composite photo to a server in the cloud.

Specifically, as shown in FIG. 1, the method for transmitting composite photo data may include the following steps:

In step 101, responding to a first transmission request triggered by a first user; obtaining target composite photo data directed by the first transmission request.

Specifically, in the present disclosure, the target composite photo data includes at least one piece of first photo data and at least one piece of first video data corresponding to the first photo data. Optionally, the first video data are video data including the first photo data. For example, there may be particularly at least one frame of image being the first photo data in the first video data. In some optional embodiments, a video frame in the first video data corresponding to the first photo data is at a position of a middle frame. For example, the photographing period corresponding to the first video data may be a preset period before and after a time point at which the first photo data is taken. In the prior art, composite photo data, such as a live photo, generally includes a photo data and a video data in the relationship described above, but it should be noted that other composite photo data types that conform to the data content described in the present disclosure should also be included within the protection scope of the present disclosure.

Optionally, the first transmission request may be triggered by the first user via a human-computer interaction device such as a keyboard, a mouse, or a touch screen, for example, it may be triggered via a touch screen of a cell phone terminal. Optionally, the first transmission request may indicate a first terminal position to be transmitted and a storage position of the target composite photo data, so that the executing subject of the present method may obtain the target composite photo data directly from the storage position.

In step 102, compressing and processing the target composite photo data according to the first photo data to obtain first compressed data having an identical data facade to that of the first photo data.

Optionally, in the present disclosure, the data facade may include at least one of a data title, a data thumbnail, a data suffix, and a data identification. Optionally, the data title may be, for example, a file name of a data file. Optionally, the data thumbnail may be a file icon of a data file or a thumbnail display image of a data file in a particular program. Optionally, the data suffix may be used to indicate a suffix of a data file format. For example, ".txt" is used to indicate data in text format and ".jpg" is used to indicate data in image format. Optionally, the data identification may be an identification carried by data that identifies data content thereof, e.g., the data content of a specific data bit.

Optionally, the compression of the target composite photo data may be performed using a data compression algorithm for compression, or may be performed using existing compression software such as ZIP or RAR.

By this step, the compressed target composite photo data has an identical data facade to the first photo data. As the user generally only has perception recognition ability for the photo data in the composite photo data when photographing, this step enables the user to directly recognize that the first compressed data to be transmitted at the moment is the data corresponding to the first photo data, so that the user perceives which photo data is the compressed data currently transmitted during subsequent data transmission, which may not lead to misoperation due to incorrectly recognition of the data, and provides a good user experience.

In step 103, transmitting the first compressed data to a first terminal position corresponding to the first transmission request.

Optionally, the first terminal position may be a position of a device other than the device in which the executing subject of the present method is positioned, such as a network address of a Network Attached Storage (NAS) server, so that a kind of inter-device data transmission may be achieved. Optionally, the first terminal position may also be a storage position other than the storage position of the target composite photo data in the device in which the executing subject of the present method is positioned, so that a kind of intra-device data transmission may be achieved, which is not limited in the present disclosure.

It is evident that, by implementing the method described in the present embodiment of the disclosure, the composite photo data may be compressed to modify the data facade to be identical to that of the photo data, and then the data may be transmitted, which allows the user to transmit the composite photo data in such a way that the user may always maintain a subjective perception of the photo data, effectively reducing the user's misoperation and improving the user's experience.

As an optional embodiment, in the aforementioned step 102, compressing and processing the target composite photo data according to the first photo data to obtain first compressed data having an identical data facade to that of the first photo data includes:

obtaining a first data title and a first data suffix of the first photo data;

compressing the target composite photo data to obtain the first compressed data;

identifying a data title of the first compressed data to be the first data title; and identifying a data suffix of the first compressed data to be the first data suffix.

Optionally, other data facade of the first compressed data, such as a data thumbnail or data identification, may also be modified to render the data facade of the first compressed data to be identical to that of the first photo data.

It is evident that, by implementing the present optional embodiment, it may compress the composite photo data to modify the data title and the data suffix to be identical to that of the photo data, and then the data may be transmitted, which allows the user to transmit the composite photo data in such a way that the user may maintain a subjective perception of the photo data more explicitly, effectively reducing the user's misoperation and improving the user's experience.

Embodiment 2

Figure 2:
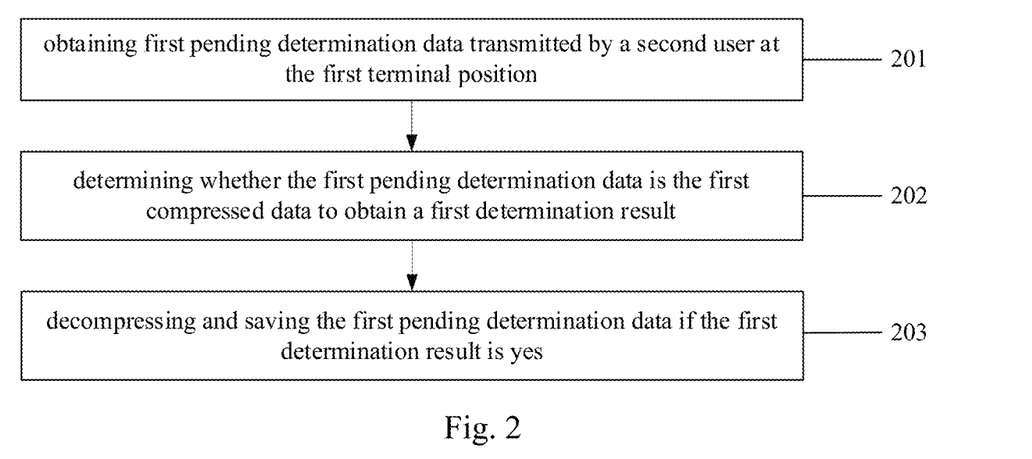
FIG. 2 is a schematic flow diagram of another method for transmitting composite photo data disclosed in an embodiment of the present disclosure.

Please refer to FIG. 2, FIG. 2 is a schematic flow diagram of another method for transmitting composite photo data disclosed in the present embodiment of the disclosure. The method described in FIG. 2 may be applied in a corresponding apparatus for transmitting composite photo data, such as a transmission terminal, a transmission device, or a transmission server being either a cloud-based server or a local server, which is not limited in the embodiment of the present disclosure. Preferably, the method of the present embodiment of the disclosure may be applied to a server terminal receiving the composite photo data uploaded for backup by the user, such as a local server or a cloud server corresponding to the first terminal position described in embodiment 1, so as to achieve the online backup of the composite photo data. Optionally, the method for transmitting data in the present embodiment of the disclosure may be performed in conjunction with the method for transmitting data in the embodiment 1, or may be performed independently, which is not limited by the present disclosure.

Specifically, as shown in FIG. 2, the method for transmitting composite photo data may include the following steps:

In step 201, obtaining first pending determination data transmitted by a second user at the first terminal position.

Specifically, the first pending determination data has an identical data facade to that of the first compressed data. Optionally, the data facade of the first pending determination data may be photo data. Please refer to the description in Embodiment 1 for an elaboration on the data facade.

Optionally, the first pending determination data may be sent to the first terminal position by a user terminal corresponding to the second user by implementing the steps in embodiment 1. Optionally, the first compressed data may be obtained by the user terminal corresponding to the second user after compressing and processing the composite photo data corresponding to the second user by implementing the steps in embodiment 1. For the elaboration on the composite photo data, please refer to the description of the target composite photo data in embodiment 1.

In step 202, determining whether the first pending determination data is the first compressed data to obtain a first determination result.

In the present step, as the data facade of the first pending determination data is identical to that of the first compressed data, rendering it unclear to the executing subject of the present embodiment whether the obtained data is compressed composite photo data or normal photo data, it is necessary to perform a determination action in order to identify a subsequent processing step.

Optionally, the method of determining whether the first pending determination data is the first compressed data may be determined directly by the identification information attached to the first pending determination data during transmission, e.g., the user terminal corresponding to the second user may transmit a parameter used to indicate the data content thereof as the identification information when the first pending determination data is sent. Optionally, the determination may also be made by analyzing the data content of the first pending determination data. For example, the determination may be made by reading the header information of the data file of the first pending determination data, such as reading the first 3 bytes of the data file of the first pending determination data and determining whether the first 3 bytes are 504B03. If so, it is determined that the first pending determination data is a compressed file, i.e., it is the first compressed data.

In step 203, decompressing and saving the first pending determination data if the first determination result is yes.

Optionally, if the first determination result is no, the first pending determination data may be directly saved, since it is the data file whose data facade is displayed at the moment, and it is not the case that the data facade has been modified.

It is evident that, by implementing the method described in the present embodiment of the disclosure, on the one hand, the composite photo data may be compressed to modify the data facade to be identical to that of the photo data, and then the data may be transmitted, which allows the user to transmit the composite photo data in such a way that the user may always maintain a subjective perception of the photo data, effectively reducing the user's misoperation and improving the user's experience. On the other hand, it is capable of determining whether the obtained data is compressed and modified composite photo data, and decompressing and saving the data if it is, thereby enabling the entire process of data transmission to be completed, and the decompressed and saved data may be used for further data recovery or data processing.

As an optional embodiment, in the aforementioned step 203, decompressing and saving the first pending determination data includes:

decompressing the first pending determination data to obtain at least one piece of second photo data and at least one piece of second video data corresponding to the second photo data;

establishing a data correspondence between the second photo data and the second video data; and saving the second photo data and the second video data, respectively.

Optionally, the data correspondence between the second photo data and the second video data may be achieved by establishing a data correspondence table or modifying the data facade of both. For more technical details of the second photo data and the second video data, reference may be made to the description of the first photo data and the first video data in embodiment 1, which is not repeated herein.

Optionally, the second photo data and the second video data are saved separately, and the second photo data may be saved in a storage space visible to the second user for receiving operational information directed by the second user, and the second video data may be saved in a storage space in a storage position different from that of the second photo data for categorizing them.

Optionally, the method further includes:

responding to a viewing request of the second user; identifying the second photo data;

transmitting the second photo data to a user terminal corresponding to the second user for viewing.

In the above step, the viewing request of the second user may be responded to, and the second photo data saved in the storage space visible to the second user is sent to the user terminal corresponding to the second user, so that the second user, either in the process of transmitting the first pending determination data (the first compressed data) or in the process of subsequently checking the saving of the data, simply views the uniform data with the photo data as the data facade, which allows the user to always maintain a subjective perception of the photo data, effectively reducing the user's misoperation and improving the user's experience.

It is evident that, by implementing the present optional embodiment, it is capable of decompressing the first pending determination data after determining that the first pending determination data is compressed composite photo data, and establishing a correspondence between the video data and the photo data, thereby allowing the entire process of data transmission to be completed, and the data after the correspondence is established allows for further data recovery or data processing operations to be performed more efficiently.

Embodiment 3

Figure 3:
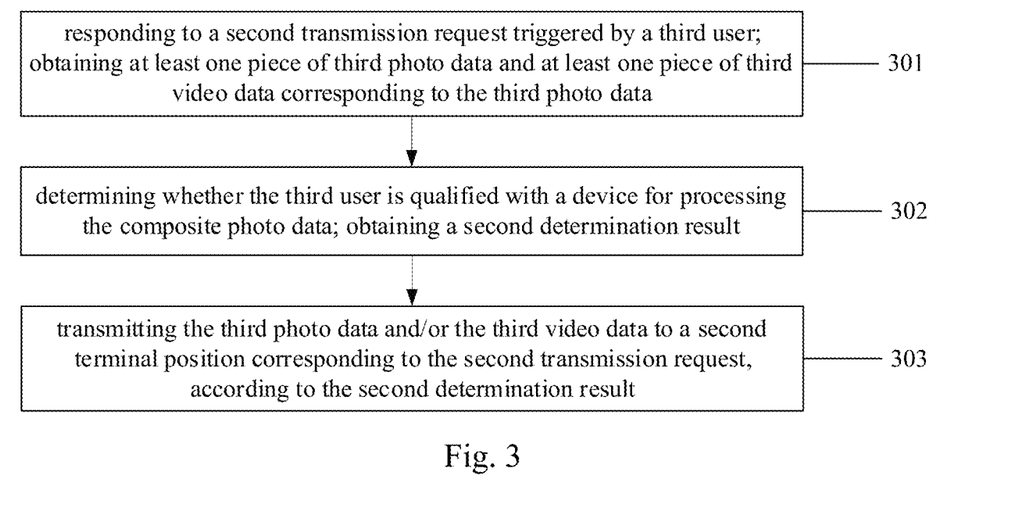
FIG. 3 is a schematic flow diagram of a further method for transmitting composite photo data disclosed in an embodiment of the present disclosure.

Please refer to FIG. 3, FIG. 3 is a schematic flow diagram of a further method for transmitting composite photo data disclosed in the present embodiment of the disclosure. The method described in FIG. 3 may be applied in a corresponding apparatus for transmitting composite photo data, such as a transmission terminal, a transmission device, or a transmission server being either a cloud-based server or a local server, which is not limited in the embodiment of the present disclosure. Preferably, the method of the present embodiment of the disclosure may be applied to a server terminal storing the composite photo data uploaded for backup by the user, such as a local server or a cloud server corresponding to the first terminal position described in embodiment 1, so as to achieve transmission of the composite photo data to a user terminal, for example, to achieve a restore-to-local operation of the composite photo data. Optionally, the method for transmitting data in the present embodiment of the disclosure may be performed in conjunction with the method for transmitting data in the embodiment 1 and/or embodiment 2, or may be performed independently, which is not limited by the present disclosure.

Specifically, as shown in FIG. 3, the method for transmitting composite photo data may include the following steps:

In step 301, responding to a second transmission request triggered by a third user; obtaining at least one piece of third photo data and at least one piece of third video data corresponding to the third photo data.

Optionally, the second transmission request may be triggered by the third user via a human-computer interaction device of the corresponding user terminal such as a keyboard, a mouse, or a touch screen, for example, it may be triggered via a touch screen of a cell phone terminal. Optionally, the second transmission request may indicate the position of the second terminal to be transmitted and the storage position of the composite photo data at the executing subject of the present embodiment, so that the executing subject of the present method may obtain the composite photo data, i.e., at least one piece of the third photo data and at least one piece of the third video data corresponding to the third photo data, directly from the storage position. For the elaboration on the composite photo data, please refer to the description of the target composite photo data in embodiment 1.

Optionally, the at least one piece of third photo data and the at least one piece of third video data corresponding to the third photo data may be sent by the user terminal corresponding to the third user to the executing subject of the present embodiment by implementing the steps in embodiment 1, and saved by the executing subject of the present embodiment by implementing the steps in embodiment 2. For more technical details of the third photo data and the third video data, reference may be made to the description of the first photo data and the first video data in embodiment 1, which is not repeated herein.

In step 302, determining whether the third user is qualified with a device for processing the composite photo data; obtaining a second determination result.

Optionally, determining whether the third user is qualified with a device for processing the composite photo data may include:

obtaining terminal device information of a user terminal corresponding to the third user;

determining whether the third user is qualified with a device for processing the composite photo data according to the terminal device information.

The terminal device information includes at least one of installed software information, performance information, and historical data processing records of the user terminal. Optionally, determining whether a software that processes composite photo data is installed in the user terminal according to the installed software information of the user terminal, and confirming that the third user is qualified with a device for processing the composite photo data, if a determination result is yes. Optionally, determining whether the performance information of the user terminal is better than a preset performance threshold, and confirming that the third user is qualified with a device for processing the composite photo data, if a determination result is yes. Optionally, determining whether a record of processing composite photo data is present or whether a record of failing to process composite photo data is absent in the historical data processing record of the user terminal, and confirming that the third user is qualified with a device for processing the composite photo data, if a determination result is yes.

In step 303, transmitting the third photo data and/or the third video data to a second terminal position corresponding to the second transmission request, according to the second determination result.

Optionally, the second terminal position corresponding to the second transmission request may be used to indicate a user terminal corresponding to the third user, thereby achieving inter-device data transmission, and it may also be used to indicate a device storage position in the executing subject of the present embodiment, thereby achieving intra-device data transmission.

It is evident that, by implementing the method described in the present embodiment of the disclosure, it is capable of determining whether the user is qualified to process the composite photo data to identify the data transmission method, thereby allowing the data to be transmitted flexibly according to the performance of the user's device in a data transmission scenario, such as data recovery, and improving the user's experience.

As an optional embodiment, in aforementioned step 303, transmitting the third photo data and/or the third video data to a second terminal position corresponding to the second transmission request, according to the second determination result, includes:

compressing and processing the third photo data and the third video data to obtain second compressed data if the second determination result is yes, and transmitting the second compressed data to the second terminal position corresponding to the second transmission request;

transmitting the third photo data to the second terminal position if the second determination result is no.

The second compressed data has an identical data facade to that of the third photo data. Optionally, the steps of compressing and processing the third photo data and the third video data may refer to the steps of compressing and processing the first photo data and the first video data in embodiment 1, which are not repeated herein.

By this step, if the user is not qualified to process the composite photo data, the photo data is sent directly to the user for viewing, while if the user is qualified to do so, the composite photo data is compressed. The compressed composite photo data has an identical data facade to the third photo data. As the user generally only has perception recognition ability for the photo data in the composite photo data when photographing, this step enables the user to directly recognize that the second compressed data to be transmitted at the moment is the data corresponding to the third photo data, so that the user perceives which photo data is the compressed data currently transmitted during subsequent data transmission, which may not lead to misoperation due to incorrectly recognition of the data, and provides a good user experience.

By implementing the present optional embodiment, it allows data processing to be performed flexibly according to the user's device and, when the user is qualified to do so, the composite photo data may be compressed to modify the data facade to be identical to that of the photo data, and then the data may be transmitted, which allows the user to transmit the composite photo data in such a way that the user may always maintain a subjective perception of the photo data, effectively reducing the user's misoperation and improving the user's experience.

Embodiment 4

Figure 4:
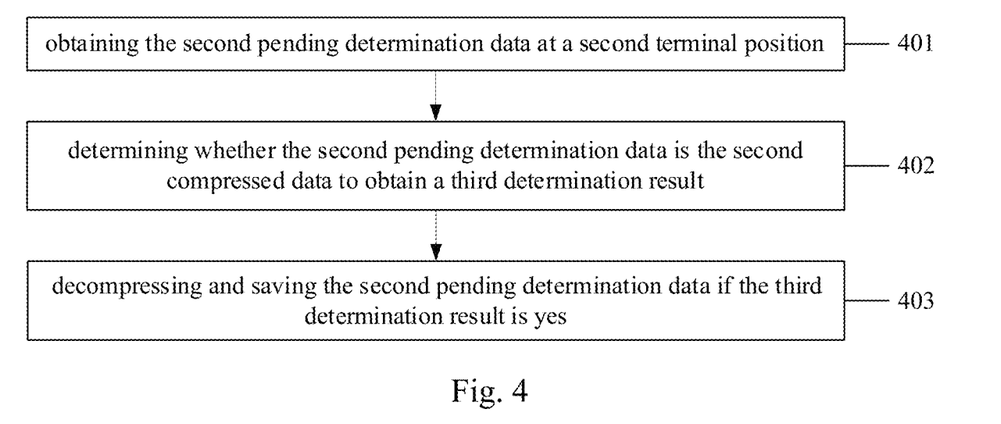
FIG. 4 is a schematic flow diagram of a further method for transmitting composite photo data disclosed in an embodiment of the present disclosure.

Please refer to FIG. 4, FIG. 4 is a schematic flow diagram of a further method for transmitting composite photo data disclosed in the present embodiment of the disclosure. The method described in FIG. 4 may be applied in a corresponding apparatus for transmitting composite photo data, such as a transmission terminal, a transmission device, or a transmission server being either a cloud-based server or a local server, which is not limited in the embodiment of the present disclosure. Preferably, the method of the present embodiment of the disclosure may be applied to a user terminal that intends to recover data from a server terminal storing composite photo data uploaded and backed up by a user to a local user terminal, such as a user terminal corresponding to the second terminal position described in embodiment 3, so as to achieve the recovery of the composite photo data to the user terminal. Optionally, the method for transmitting data in the present embodiment of the disclosure may be performed in conjunction with the method for transmitting data in at least one of the aforementioned embodiments, or may be performed independently, which is not limited by the present disclosure.

Specifically, as shown in FIG. 4, the method for transmitting composite photo data may include the following steps:

In step 401, obtaining the second pending determination data at a second terminal position.

Specifically, the second pending determination data has an identical data facade to that of the second compressed data. Optionally, the second pending determination data may be sent by the server terminal to the second terminal position of the executing subject of the present embodiment. Optionally, the data facade of the second pending determination data may be a data facade of the photo data. For technical details regarding the data facade, reference may be made to the description in embodiment 1.

Optionally, the second compressed data may be the compressed and processed composite photo data obtained by the server terminal according to the steps in embodiment 3.

In step 402, determining whether the second pending determination data is the second compressed data to obtain a third determination result.

In the present step, as the data facade of the second pending determination data is identical to that of the second compressed data, rendering it unclear to the executing subject of the present embodiment whether the obtained data is compressed composite photo data or normal photo data, it is necessary to perform a determination action in order to identify a subsequent processing step.

Optionally, the method of determining whether the second pending determination data is the second compressed data may refer to the description of the method of determining whether the first pending determination data is the first compressed data in embodiment 2, which is not repeated herein.

In step 403, decompressing and saving the second pending determination data if the third determination result is yes.

Optionally, if the third determination result is no, the second pending determination data may be directly saved, since it is the data file whose data facade is displayed at the moment, and it is not the case that the data facade has been modified.

Optionally, the method of decompressing and saving the second pending determination data may refer to the description of the method of decompressing and saving the first pending determination data in embodiment 2, which is not repeated herein.

It is evident that, by implementing the method described in the present embodiment of the disclosure, on the one hand, the composite photo data may be compressed to modify the data facade to be identical to that of the photo data, and then the data may be transmitted, which allows the user to transmit the composite photo data in such a way that the user may always maintain a subjective perception of the photo data, effectively reducing the user's misoperation and improving the user's experience. On the other hand, it is capable of determining whether the obtained data is compressed and modified composite photo data, and decompressing and saving the data if it is, thereby enabling the entire process of data transmission to be completed, and the decompressed and saved data may be used for further data recovery or data processing.

Embodiment 5

Figure 5:
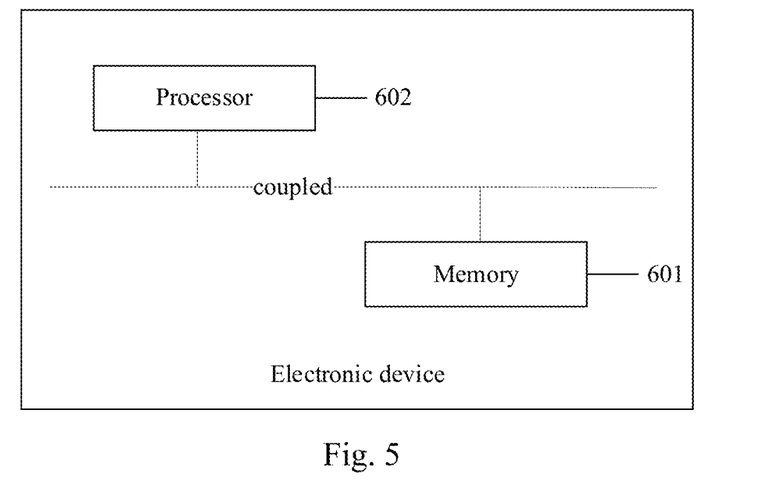
FIG. 5 is a schematic structural diagram of an electronic device disclosed in an embodiment of the present disclosure.

Please refer to FIG. 5, FIG. 5 is a structural diagram of an electronic device disclosed in the present embodiment of the disclosure. As shown in FIG. 5, the electronic device may include:

a memory 601, memorized with an executable code; and
a processor 602, coupled with the memory 601, in which the processor 602 invokes the executable code memorized in the memory 601 to perform some or all steps in the method for transmitting composite photo data, disclosed in at least one of the Embodiments 1-4 of the present disclosure.

Specific technical details regarding the implementation of transmitting composite photo data when the computer program is executed by the electronic device as described above have been discussed in detail in the aforementioned methods and steps, which therefore are not repeated herein.

Embodiment 6

Disclosed in the present embodiment of the disclosure is a non-transitory computer memory medium including computer instructions, in which the computer instructions are invoked to perform some or all steps in the method for transmitting composite photo data, disclosed in at least one of the embodiments 1-4 of the present disclosure.

The foregoing describes specific embodiments of the present specification, and other embodiments still fall within the scope of the appended claims. In some cases, the actions or steps documented in the claims may be performed in a different order than in the embodiments and still achieve the desired results. In addition, the processes depicted in the accompanying drawings do not necessarily have to be followed in the particular order or consecutive order shown to achieve the desired results. In some implementations, multitasking and parallel processing are also possible or may be advantageous.

The invention claimed is:

1. A method for transmitting composite photo data, comprising:

responding to a first transmission request triggered by a first user; obtaining target composite photo data directed by the first transmission request, wherein the target composite photo data comprises at least one piece of first photo data and at least one piece of first video data corresponding to the first photo data;

compressing and processing the target composite photo data according to the first photo data to obtain first compressed data having an identical data facade to that of the first photo data;

transmitting the first compressed data to a first terminal position corresponding to the first transmission request;

the method further comprises:

obtaining first pending determination data transmitted by a second user at the first terminal position, the first pending determination data having an identical data facade to that of the first compressed data;

determining whether the first pending determination data is the first compressed data to obtain a first determination result; and decompressing and saving the first pending determination data if the first determination result is yes.

2. The method for transmitting composite photo data according to claim 1, wherein compressing and processing the target composite photo data according to the first photo data to obtain the first compressed data having an identical data facade to that of the first photo data comprises:

obtaining a first data title and a first data suffix of the first photo data;

compressing the target composite photo data to obtain the first compressed data;

identifying a data title of the first compressed data to be the first data title; and identifying a data suffix of the first compressed data to be the first data suffix.

3. The method for transmitting composite photo data according to claim 1, wherein decompressing and saving the first pending determination data comprises:

decompressing the first pending determination data to obtain at least one piece of second photo data and at least one piece of second video data corresponding to the second photo data;

establishing a data correspondence between the second photo data and the second video data; and saving the second photo data and the second video data, respectively.

4. The method for transmitting composite photo data according to claim 1, further comprising:

responding to a second transmission request triggered by a third user; obtaining at least one piece of third photo data and at least one piece of third video data corresponding to the third photo data;

determining whether the third user is qualified with a device for processing the composite photo data; obtaining a second determination result; and transmitting the third photo data and/or the third video data to a second terminal position corresponding to the second transmission request, according to the second determination result.

5. The method for transmitting composite photo data according to claim 4, wherein transmitting the third photo data and/or the third video data to a second terminal position corresponding to the second transmission request, according to the second determination result, comprises:

compressing and processing the third photo data and the third video data to obtain second compressed data if the second determination result is yes, and transmitting the second compressed data to the second terminal position corresponding to the second transmission request, the second compressed data having an identical data facade to that of the third photo data; and transmitting the third photo data to the second terminal position if the second determination result is no.

6. The method for transmitting composite photo data according to claim 5, further comprising:

obtaining second pending determination data at the second terminal position, the second pending determination data having an identical data facade to that of the second compressed data;

determining whether the second pending determination data is the second compressed data to obtain a third determination result; and decompressing and saving the second pending determination data if the third determination result is yes.

7. The method for transmitting composite photo data according to claim 1, wherein the data facade comprises at least one of a data title, a data thumbnail, a data suffix, and a data identification.

8. An electronic device, comprising:

a memory, memorized with an executable code; and a processor, coupled with the memory, wherein the processor invokes the executable code memorized in the memory to perform a method for transmitting composite photo data, the method comprising:

responding to a first transmission request triggered by a first user; obtaining target composite photo data directed by the first transmission request, wherein the target composite photo data comprises at least one piece of first photo data and at least one piece of first video data corresponding to the first photo data;

compressing and processing the target composite photo data according to the first photo data to obtain first compressed data having an identical data facade to that of the first photo data;

transmitting the first compressed data to a first terminal position corresponding to the first transmission request;

the method further comprises:

obtaining first pending determination data transmitted by a second user at the first terminal position, the first pending determination data having an identical data facade to that of the first compressed data;

determining whether the first pending determination data is the first compressed data to obtain a first determination result; and decompressing and saving the first pending determination data if the first determination result is yes.

9. A computer memory medium, wherein the computer memory medium memorizes computer instructions, and a method for transmitting composite photo data is performed when the computer instructions are invoked; the method comprising:

responding to a first transmission request triggered by a first user; obtaining target composite photo data directed by the first transmission request, wherein the target composite photo data comprises at least one piece of first photo data and at least one piece of first video data corresponding to the first photo data;

compressing and processing the target composite photo data according to the first photo data to obtain first compressed data having an identical data facade to that of the first photo data;

transmitting the first compressed data to a first terminal position corresponding to the first transmission request;

the method further comprises:

obtaining first pending determination data transmitted by a second user at the first terminal position, the first pending determination data having an identical data facade to that of the first compressed data;

determining whether the first pending determination data is the first compressed data to obtain a first determination result; and decompressing and saving the first pending determination data if the first determination result is yes.

\* \* \* \* \*